United States Patent [19]

Schulz

[11] 4,140,210
[45] Feb. 20, 1979

[54] CENTRIFUGALLY AND TORQUE ENGAGED CLUTCH

[75] Inventor: Willis L. Schulz, Utica, Mich.

[73] Assignee: Borg-Warner Corporation, Chicago, Ill.

[21] Appl. No.: 796,498

[22] Filed: May 12, 1977

[51] Int. Cl.² .................. F16D 43/14; F16H 41/18
[52] U.S. Cl. ........................... 192/103 B; 192/3.31; 192/45.1
[58] Field of Search ......... 192/105 BA, 103 B, 103 F, 192/45.1, 3.31, 3.28, 75

[56] References Cited

U.S. PATENT DOCUMENTS

| 2,235,673 | 3/1941 | Dodge | 192/103 B |
| 2,552,747 | 5/1951 | Strimple | 192/105 BA |
| 2,626,034 | 1/1953 | Fawick | 192/75 X |
| 2,691,437 | 10/1954 | Dalrymple | 192/105 BA |
| 3,437,186 | 4/1969 | Roper | 192/103 F X |

FOREIGN PATENT DOCUMENTS 760249  10/1956  United Kingdom ............. 192/3.31

Primary Examiner—Benjamin W. Wyche
Attorney, Agent, or Firm—Robert L. Zieg

[57] ABSTRACT

A speed-responsive engaging mechanism adapted for use in a hydrodynamic device to couple turbine and impeller members including a disc secured to the turbine member having a series of cam surfaces thereon formed in apertures in the discs with a series of friction shoe assemblies mounted in the apertures in engagement with the cam surfaces. The friction shoe assemblies engage with the impeller at a predetermined speed of rotation of the turbine member, and the cam means induces a wedging engagement of the shoes with the impeller member. Spring means are provided to retain the shoe assemblies in the apertures, and a roller mechanism is provided in each shoe assembly to provide relatively frictionless relative movement between the cam surfaces and the shoe assemblies. Means are provided in the apertures which in cooperation with the spring means, tilt the shoe assemblies to eliminate the viscous drag effect.

5 Claims, 3 Drawing Figures

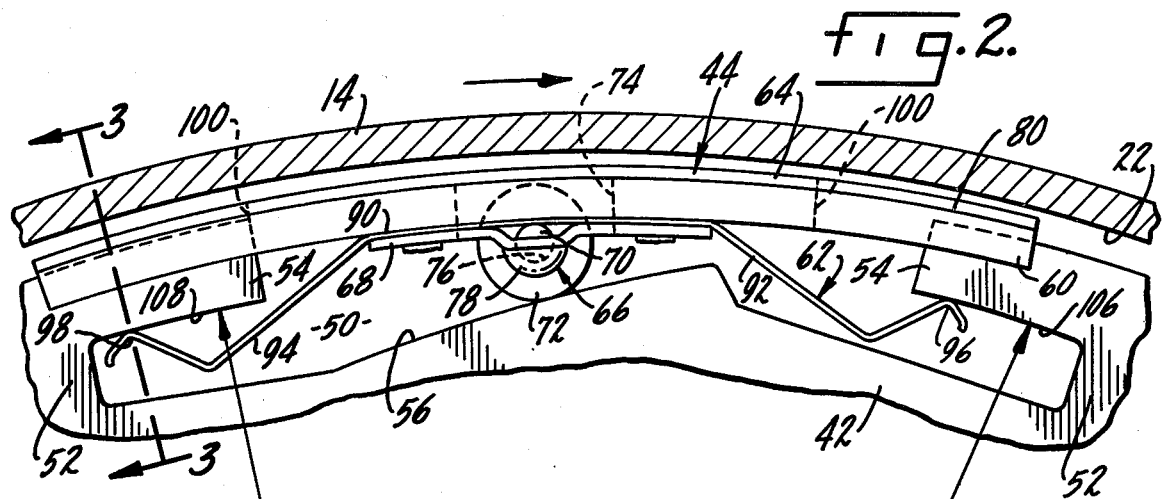
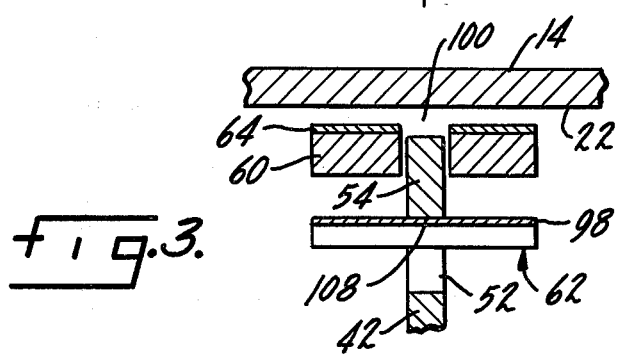

CENTRIFUGALLY AND TORQUE ENGAGED CLUTCH

BACKGROUND OF THE INVENTION

1. Field of the Invention

This application relates to the field of speed-responsive engaging devices for hydrodynamic devices.

2. Prior Art

It is known in the prior art to provide lock-up clutches for hydrodynamic devices. More particularly, copending applications, Ser. No. 620,461 filed Oct. 7, 1975, now U.S. Pat. No. 4,049,094 and Ser. No. 700,998 filed June 29, 1976 of common assignee provide clutch mechanisms for hydrodynamic devices having a shoe assembly engaged by centrifugal force and, in addition, engaged by a wedging effect of cam surfaces, and such clutch devices lock together the impeller and turbine elements to improve efficiency by eliminating slippage. Further copending application Ser. No. 732,265 filed Nov. 14, 1976 provides a structure having rollers mounted in the shoe assemblies in engagement with the cams to provide a relatively frictionless engagement between the cam and show assemblies. It has been recognized that the structures of the aforementioned applications as well as the device to be described herein provide solutions to problems encountered with lock-up clutches to provide a lock-up clutch which disengages during torque impulses or torque reversals to provide smooth, shockless operation and eliminate torsional vibrations.

These previous solutions to the torque converter clutch problem, although workable and dramatic improvements over those known prior, have a somewhat sensitive characteristic which can be improved. This characteristic depending upon the angle of the cams used and other dimensional and operational characteristics is that at times the shoe assemblies will tend to be coupled to the drum engaging surface by the viscous drag of oil in the converter housing before the desired time of clutch engagement is reached.

SUMMARY OF THE INVENTION

The present invention achieves all of the desirable objects listed above and provides an improved clutch mechanism for a hydrodynamic device in which the shoe assemblies will be assisted in engaging the drum surface at the proper time. The present invention uniquely solves this problem by providing means in the disc carrying the shoe assemblies which will tilt the shoe assemblies away from the drum surface on one end which will place the shoe assemblies at an angle with respect to the oil stream in the converter housing to assist in holding the shoe assemblies away from the drum surface under conditions in which the viscous drag of the oil is tending to provide a clutching action between the shoe assemblies and the drum surface prior to the time the desired RPM for engagement is reached.

BRIEF DESCRIPTION OF THE DRAWINGS

FIG. 2 is a sectional view taken along the line 2—2 of FIG. 1.

FIG. 3 is a sectional view taken on line 3—3 of FIG. 2.

BRIEF DESCRIPTION OF THE PREFERRED EMBODIMENT

Figure 1:
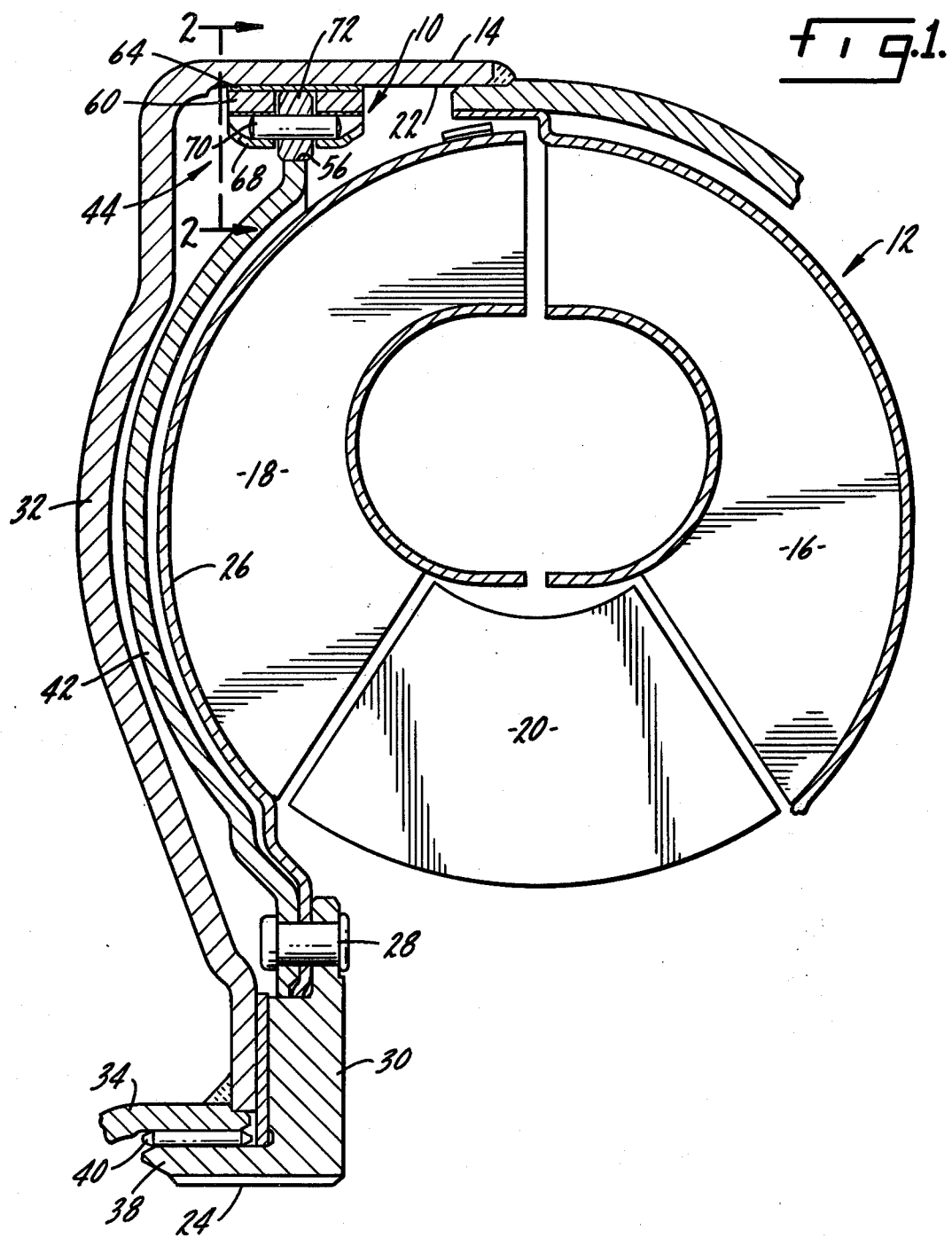
FIG. 1 is a cross-sectional view through a clutch mechanism for a hydraulic torque converter.

Referring to FIG. 1, an improved lock-up clutch or engaging mechanism 10 is disclosed. Clutch 10 is shown in a hydrodynamic device 12 which may be a hydraulic torque converter having a drive shell 14 connected to drive a vaned impeller member 18 driven hydrodynamically by impeller 16 and includes a stator member 20. The improved lock-up clutch 10 is operative to lock turbine to the impeller by means of frictional engagement between clutch 10 and an inner annular or drum surface 22 in shell 14.

Turbine 18 includes an outer radial vaned portion 26 which is connected to a hub 30 by rivets 28. Hub 30 is splined at 24 to be connected to a transmission input shaft as is known in the art. Drive shell 14 includes a radially extending portion 32 connected to a central hub 34 which is driven by the engine of the vehicle. Hub 30 of turbine 18 includes an axially extending bearing portion 38. A bearing 40 is provided mounting hub 30 within hub portion 34. Turbine 18 is thus mounted for concentric rotation within shell 14 to provide for concentric rotation between the turbine and impeller 16.

The unique clutch 10 of the present invention is comprised of an annular curved disc 42 and friction devices or shoe assemblies 44. Disc 42 is concentrically mounted upon turbine hub 30 and is secured thereto by rivets 28. Annular disc 42 is curved to conform with the shape and curvature of turbine 18 and radial portion 32 to provide minimum space requirements for clutch mechanism 10 within torque converter 12. As illustrated in FIG. 2, disc 42 has a series of apertures 50 in which shoe assemblies 44 are mounted. Apertures 50 include a series of T-shaped projections 52 which define tabs 54 extending radially toward the center of apertures 50. Tabs 54 have cooperative engagement with show assemblies 44 to retain and orient same on discs 42 as will be described later. Provided centrally of apertures 50 is a cam surface 56, also referred to as a wedge or ramp surface. The cam surfaces 56 have a relatively slight curvature.

Shoe assemblies 44 are comprised of a rectangular friction shoe 60 being generally arcuate in cross-section to conform with the arcuate shape of surface 22. Assembled to assembled to the shoe is a roller mechanism 66 and a roller retainer 68. Roller mechanism 66 is comprised of a roller pin or axle 70 upon which a roller 72 is mounted. Roller 72 is centrally mounted in shoe 60 in a rectangular slot 74 upon axle 70. Axle 70 is received in partly cylindrical bearing supports or journals 76 defined within a raised portion 78 on retainers 68 on either side of slot 74.

Roller assembly 66 is mounted securely within retainer 68 such that the roller will roll on pin 70, pin 70 serving as a non-rotatable axle. Optionally, the pin 70 may be rotatable in journals 76 and be press-fitted in roller 72 whereby the roller and axle turn as a unit.

Friction lining 64 is bonded to the external arcuate surface 80 on shoe 60. Friction lining 64 may be of a paper or other known type. Spring 62 and retainer 68 are secured to shoe 60 by a riveting or other known technique.

Assembly 44 is secured together by locating the retainer and the spring together on shoe 60 with the roller assembly and its axles 70 mounted in journals 76, and then the retainer 68 is secured to shoe 60 as for example by rivets.

Further details of construction may be obtained by review of copending application Ser. No. 732,265 filed Nov. 14, 1976 now U.S. Pat. No. 4,083,440 which is incorporated herein by reference.

Spring 62 includes a central body portion 90 having S-shaped sections 92 and 94 adjoining the body 90 at either end thereof. A corner portion 96 of S-shaped section 92 and a corner portion 98 of section 94 engage arcuate undersurfaces 106 and 108 respectively, of tabs 54 and retain shoe assemblies 44 within apertures 50 and resist outward movement of shoe assemblies 44 induced by centrifugal force.

Friction shoes 60 have longitudinal centrally located slots 100 on either end thereof. Slots 100 are slightly larger than the thickness of disc 42 and receive the T-shaped portions 52 of the disc therewithin when shoe assembly 44 is mounted in place in apertures 50. Thus, the shoe assembly 44 is guided by the T-shaped sections 52 of the disc 42 as it moves arcuately and along the cam surface 56 when in operation.

Surfaces 106 under tabs 54 on the right side of apertures 50 as viewed in FIG. 2 are formed by a radius $R_2$ extending from the center of rotation Q of the apparatus. Surfaces 108 under tabs 54 on the left side of apertures 50 as viewed in FIG. 2 are formed by a radius $R_2$ from center Q. The unique system disclosed has radius $R_1$, shorter than radius $R_2$ by a predetermined amount which will provide the tilted configuration of shoe assemblies 44 as will be later described.

As described above, the unique roller mechanism 66 rolls on cam surface 56 as assembly 44 moves arcuately and, thus, provides a relatively frictionless engagement between cam 56 and shoe assembly 44.

The operation of the engaging mechanism 10 of the present invention is that initially the shoe assemblies will be in their retracted position as pictured in FIG. 2, the shoe 60 not in engagement with surface 22. As impeller 16 is rotated, as would be the case when the vehicle is to be moved forward from a stopped position, turbine 18 will begin to rotate, and as the speed increases, shoe assemblies 44 tend to move outwardly in response to centrifugal force against the force of springs 62.

Due to the engagement of the spring 62, particularly corner 98 with surface 108 and corner 96 with surface 106, and the fact that radius $R_1$ is shorter, in the retracted position of the shoe assemblies 44 the shoe 60 will be tilted such as pictured in FIG. 2 in that the leading edge of the shoe as compared to the direction of rotation shown by the arrow in FIG. 2 will be further away from the surface 22 than the other parts of the shoe 60. The unique arrangement which utilizes the surfaces 106 and 108 to retain the shoe assemblies 44 in apertures 50 in cooperation with the spring 62 and further having radius $R_1$ shorter to provide the tilting effect provides a structure in which the tendency for premature engagement is eliminated. With the direction of rotation as pictured by the arrow, the oil stream which results from relative rotation of parts with respect to the oil contained within the torque converter assembly will provide a angular impingement of the oil stream on the shoe assembly 44, and will tend to hold the shoe away from the drum to eliminate the viscous drag effect. The viscous drag effect is a premature type of engagement which can take place in structures of this type which are filled with oil in that the viscous drive induced by the oil due to the closeness of the shoe assemblies 44 to the engaging surfaces 22 will provide a slipping type of drag or clutch engagement between the shoe assemblies and the surface 22. This viscous drag is eliminated by the unique method of tilting the assemblies 4 by use of the shorter radius $R_1$ for surface 108 to provide the angular impingement of the oil stream on the shoe assembly 44.

The operation of the clutch mechanism 10 with the exception for the anti-drag feature of the tilting shoe assembly 44 is identical to that described with respect to the above mentioned application, Ser. No. 732,265 filed Nov. 14, 1976.

When shoes 60 and, in particular, friction material 64 engage surface 22, assembly 44 will move arcuately with respect to disc 42 along cam 56 in a clockwise direction, as illustrated in FIG. 2. The roller assembly 66 rolls along surface 56, and due to the wedging action of cam surface 56, shoes 60 will be wedged into engagement with surface 22 to lock turbine 18 to shell 14 such that impeller 16 and turbine 18 rotate together as a unit.

The engaging mechanism 10 of the present invention, when installed in a hydraulic torque converter as used in an automotive automatic transmission, will release under several conditions which are deisred in an environment of this type. The release and re-engagement of the clutch 10 occurs due to the inherent structure of the device without the requirement of any outside controls.

It is to be understood that the use of the term "disengaged" herein is meant to indicate a condition in which shoes 60 move radially inwardly out of contact with surface 22. When the term "released," as applied to clutch 10, is used herein, it is intended to include a condition in which shoes 60 may still be in contact with surface 22, but the engaging forces are such that slipping of surface 22 with respect to shoes 60 may take place or, in other words, turbine 18 and impeller 16 may rotate at different speeds.

Due to the design of clutch 10, when the clutch is locked up during operation of the vehicle and the throttle of the vehicle is suddenly depressed to demand higher torque the drive-line torque will rise to a greater value than the torque capacity of clutch 10 causing clutch 10 to release and allowing the hydraulic torque converter to return to slipping condition, which is desired at such times. This condition may also occur on upshifts in the transmission when a sudden surge or increase in torque will occur momentarily.

When a torque reversal occurs in the drive-line, due to the inherent characteristics of clutch 10, the wedging effect is removed, and the torque capacity of clutch 10 drops to a lower value. Thus, the clutch momentarily releases on down shifts, since a torque reversal may occur at such times. As known in the art, during shifting, release of clutch 10 is desired to allow the converter to return to its shock absorbing characteristics.

It has also been found during test work that upon shifting or ratio changing in an automatic transmission with the present device installed, the torque pulse or reversal which occurs during a shift allows the lock-up clutch 10 to release under these conditions. This inherent feature of the present design is extremely important in that automatic shifts are much smoother when a hydraulic torque converter is operating in its released or normal manner; and if a torque converter is locked up, as, for example, by a conventional lock-up clutch at the time of the shift, the shift could be much harsher than desirable.

The operational characteristics of the torque converter clutch as set out above are more fully explained in above-mentioned copending applications, Ser. No. 620,461 filed Oct. 7, 1975 now U.S. Pat. No. 4,049,094, and Ser. No. 732,265 filed Nov. 14, 1976, now U.S. Pat. No. 4,083,440 and reference may be had thereto for a fuller understanding of such characteristics.

It is to be noted that upon engagement of shoes 60 with surface 22, the shoe assemblies can rock on the cam surface 56 about roller assembly 66 to self-align with respect to the clutch surface 22.

As mentioned above, cam surfaces 56 are curved, and since the surface on roller 72 is cylindrical, there is line contact between roller 72 can cam surface 56. The purpose of having cam surface 56 curved is to maintain a uniform wedge angle regardless of the position of the friction shoe along the cam surface. As will be recognized by those of ordinary skill in the art, the wedge angle is the angle between a radius drawn from the center of curvature of surface 56 through the point of contact between surface 56 and roller surface 72 and a radius drawn from the center of rotation of internal clutch surface 22 and the point of contact between the roller surface and surface 56. It will also be recognized by those skilled in the art that if cam surface 56 is a flat surface, the wedge angle will vary significantly as the friction shoe moves along surface 56. It will be readily apparent that for the device to function best, it is important to have a constant wedge angle to maintain constant torque capacity even with the dimensional variation of the parts.

The wedge angle used, which can be established by varying the curve of surface 56, may be selected from a wide range of the angles, the major requirement being the wedge angle must be greater than the angle of friction for the device to engage and disengage properly. As is known, the friction angle is a specific angle for paritcular types of materials in engagement, being the angle of inclination to an inclined plane on which a body will just overcome its tendency to slide, the inclined plane and the body being of the materials for which the friction angle is to be established.

It is to be noted that although the shoe assembly 44 with roller mechanism 66 is shown as used with a clutch 10 having a disc 42 with cams 56 therein, the shoe assemblies 44 could also be used with a clutch having a formed sheet metal type of support having ramps formed therein such as disclosed in copending application Ser. No. 620,461 filed Oct. 7, 1975, and now U.S. Pat. No. 4,049,094. Further, it is contemplated that more than one roller assembly 66 could be used in each assembly 44, although the single roller assembly described above is preferred. It is further contemplated that although a roller 72 of cylindrical form is shown and described, the present invention contemplates any type of friction relieving rolling device which may for example include a ball bearing assembly around axle 70, a ball type of spherical mounted on axle 70, or a single diameter cylindrical roller extending nearly the whole width of shoe 60.

Further, as will be apparent, other methods of tilting the shoe assemblies to prevent viscous drag are contemplated. For example, the shape or strength of section 94 of spring 62 can be varied with respect to section 92, to provide the tilting effect.

What is claimed is:

1. An engaging mechanism comprising, first and second relatively rotating member, an annular disc fixed to said first member, a plurality of shoe assemblies mounted in said disc, cam means on said disc, said assemblies including means in engagement with said cam means, centrifugal force acting to urge said assemblies into engagement with said second member at a given speed of rotation, each assembly engaging a pair of surfaces on said disc to retain said assembly on said disc, the cooperative engagement between said surfaces and said assemblies acting to tilt said assemblies whereby fluid in said mechanism will impinge on said assemblies at an angle with respect thereto to prevent viscous drag between said shoe assemblies and said second member.

2. A mechanism as claimed in claim 1 wherein said assemblies include spring means secured to said assemblies and in engagement with said surfaces.

3. A mechanism as claimed in claim 2 wherein one of said surfaces engaged by each shoe assembly is formed by a different radius of curvature with respect to the center of rotation than the other surface engaged by each shoe assembly, to provide the tilting effect.

4. A mechanism as claimed in claim 1 wherein said surfaces are formed on the underside of tabs provided on either side of apertures formed in the disc, said assemblies being received in said apertures.

5. A mechanism as claimed in claim 1 wherein each said shoe assembly includes a friction shoe, a retainer secured to said shoe, a roller, an axle for said roller, said retainer forming a journal for said axle, and said roller engaging said cam means.

* * * * *

UNITED STATES PATENT OFFICE
CERTIFICATE OF CORRECTION

PATENT NO. : 4,140,210
DATED : February 20, 1979
INVENTOR(S) : WILLIS L. SCHULZ

It is certified that error appears in the above–identified patent and that said Letters Patent are hereby corrected as shown below:

Claim 1 -- Column 6, line 18, cancel "member" and insert -- members --.

Signed and Sealed this

Twenty-second Day of May 1979

[SEAL]

Attest:

RUTH C. MASON
Attesting Officer

DONALD W. BANNER
Commissioner of Patents and Trademarks